United States Patent [19]
Manber et al.

[11] 4,271,511
[45] Jun. 2, 1981

[54] COMMUNICATIONS NETWORK

[76] Inventors: Solomon Manber, Hoffstot La., Sands Point, N.Y. 11050; George Klein, 159 Robby La., Manhasset Hills, N.Y. 11040

[21] Appl. No.: 33,162

[22] Filed: Apr. 25, 1979

[51] Int. Cl.³ ............................................. G06F 11/20
[52] U.S. Cl. ................................. 371/8; 340/147 SC; 370/16
[58] Field of Search ................. 371/8, 68; 370/15, 16; 455/8; 340/147 SC

[56] References Cited
U.S. PATENT DOCUMENTS

| | | | |
|---|---|---|---|
| 3,859,468 | 1/1975 | Smith et al. | 370/16 |
| 3,991,278 | 11/1976 | Fang et al. | 370/16 |
| 4,017,828 | 4/1977 | Watanabe et al. | 371/8 |
| 4,030,069 | 6/1977 | Henrickson et al. | 340/147 SC |
| 4,048,446 | 9/1977 | Hafner et al. | 370/16 |
| 4,159,470 | 6/1979 | Strojny et al. | 371/8 |
| 4,186,380 | 1/1980 | Edwin et al. | 340/147 SC |

*Primary Examiner*—Charles E. Atkinson
*Attorney, Agent, or Firm*—Hane, Roberts, Spiecens & Cohen

[57] ABSTRACT

A communications network is composed of a central mode and a plurality of remote nodes with each of the nodes including receiving means for receiving signals and transmitting means for transmitting signals. At the remote nodes each including two receiving means and a signalling means for transferring to the associated transmitting means for transferring to the associated transmitting means one kind of signal when signals are received by both associated receiving means and another kind of signal when only one of the receiving means receives a signal. In general, means connect the transmitting means of each node to one of the receiving means of two different successive nodes in such a manner that a unidirectional communication loop is obtained. In one embodiment of the invention all nodes are alike and one node is assigned to be the central node and the others to be remote nodes. In another embodiment the central node is unique and the remote nodes alike.

7 Claims, 5 Drawing Figures

COMMUNICATIONS NETWORK 10

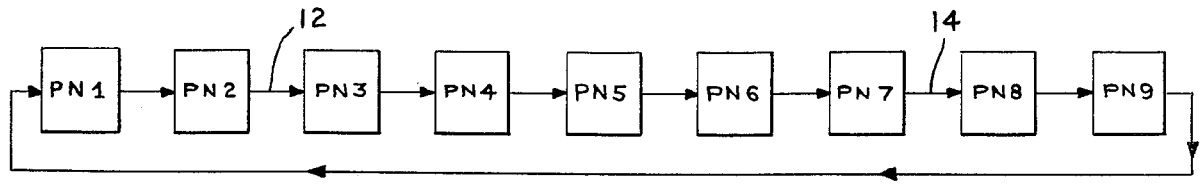
FIG. 1 COMMUNICATIONS NETWORK PA PRIOR ART
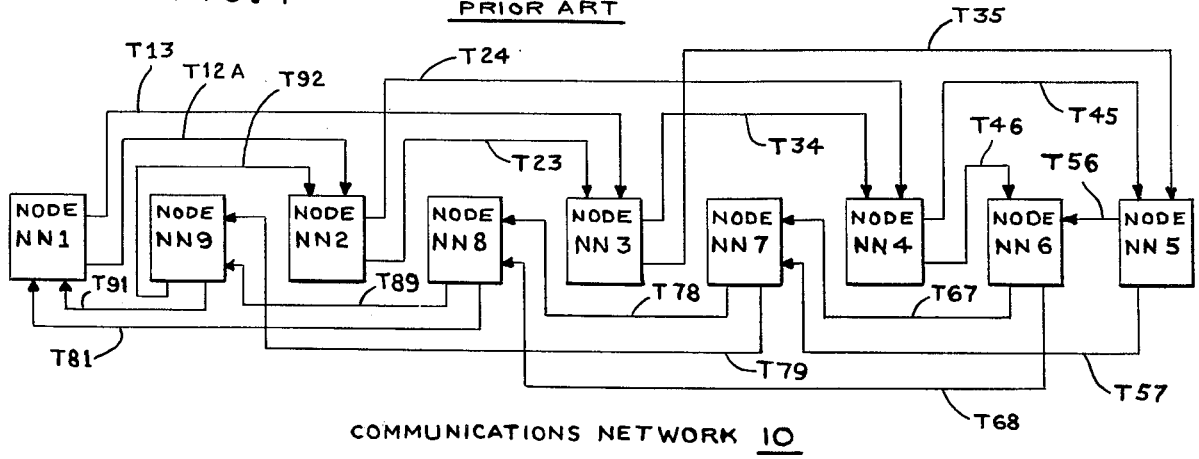
COMMUNICATIONS NETWORK 10
FIG. 2
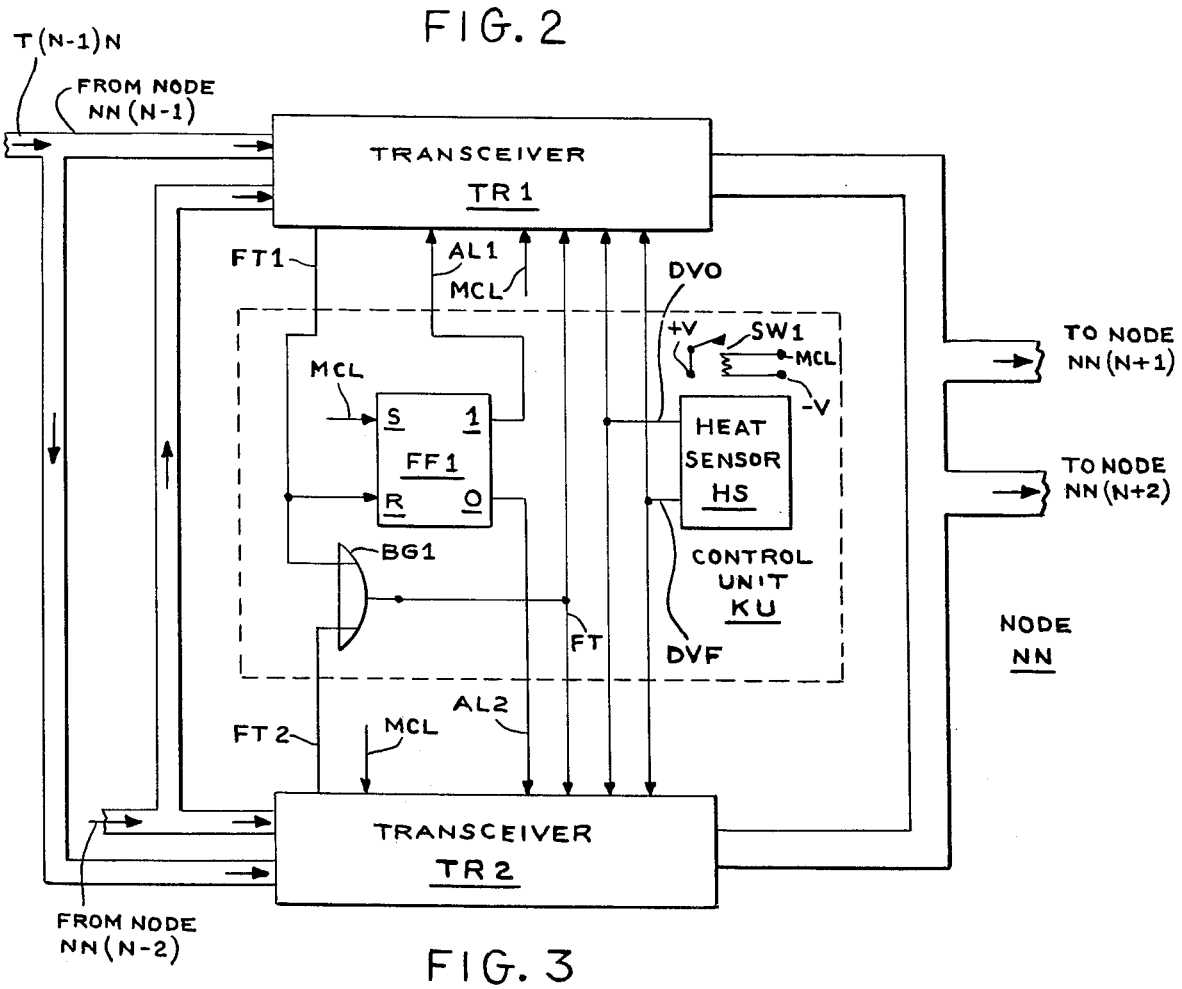
FIG. 3

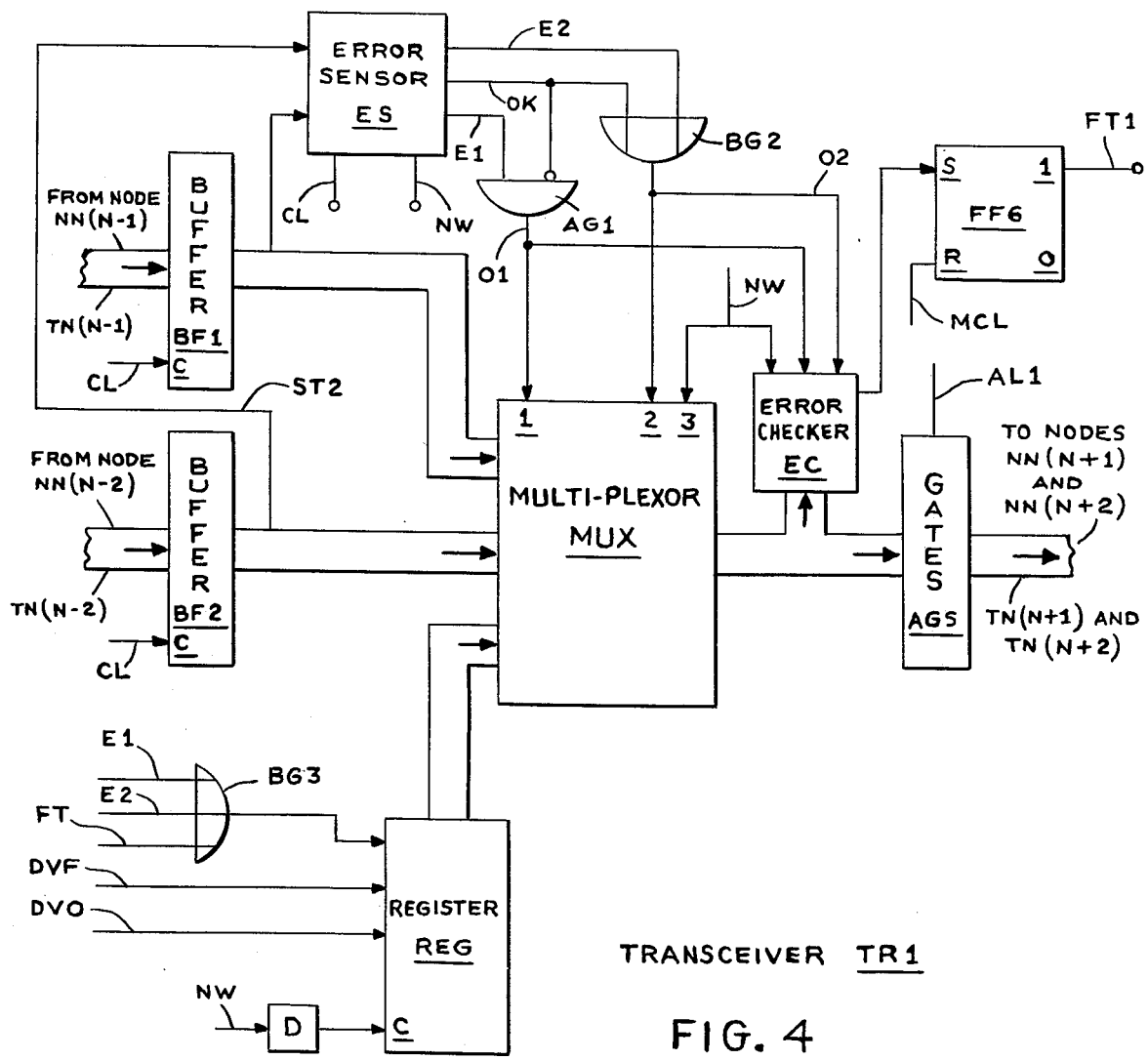
FIG. 4 TRANSCEIVER TR1
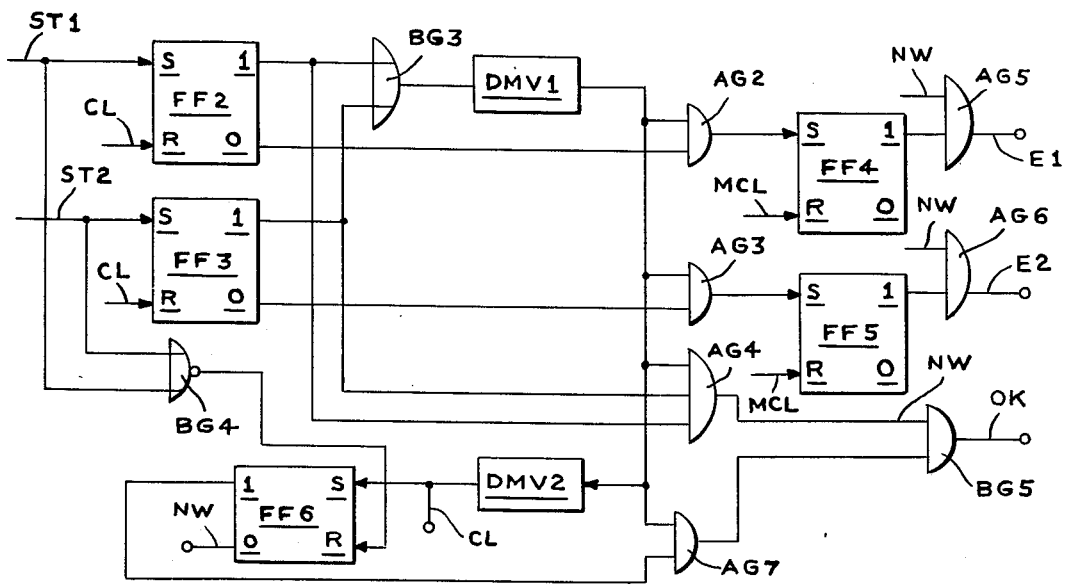
FIG. 5 ERROR SENSOR ES

COMMUNICATIONS NETWORK

BACKGROUND OF THE INVENTION

This invention pertains to communication networks and more particularly to those networks connected in loops.

Prior communication networks primarily consist of straight forward communication loops in which information travels around the network unidirectionally. Such a loop is shown in FIG. 1. Improvements in networking resulted in networks in which the flow of information is bi-directional. This was especially useful if a break or malfunction occurred either in the connecting cables or in the node equipment. If a break occurred in cable 12, the direction of communication reversed at the break and all nodes remained connected to the network. If, however, a second break or malfunction occurred say, in cable 14, then the network ceased to communicate, even though its nodes may have remained perfectly functional. In conventional networks, each node is connected to contiguous nodes. There is a disadvantage to this manner of connection, if the physical layout of the network is very long, i.e., from the first node PN1 of a path and PN9 the last node PN9 of the path. Such a configuration may occur in a high rise building with a node on every floor. The return loop, cable 16, in such a configuration may be physically very long and thus susceptible to noise interference.

SUMMARY OF THE INVENTION

It is a general object of the invention to provide an improved communication network.

It is another object of the invention to provide an improved communication network in which faults are continuously monitored by each node.

It is a further object to provide such a network with minimized data line lengths.

It is a still further object of the invention to provide novel redundancy in a communication network for enhancing reliability.

Briefly, the invention contemplates a communication network comprising a plurality of nodes capable of receiving and transmitting information. At least some of the nodes have two receiving means and a signalling means. The signalling means transfers to the associated transmitting means one kind of signal when signals are received by both associated receiving means and another kind of signal when only one of the receiving means receives a signal. The transmitting means of each node is connected to one of the receiving means of two different nodes in such a manner that a unidirectional communications loop is obtained.

BRIEF DESCRIPTION OF THE DRAWING

Other objects, the features and advantages of the invention will be apparent from the following detailed description when read with the accompanying drawing which shows by way of example, and not limitation the presently preferred embodiment of the invention. In the drawing:

FIG. 1 shows a prior art communication network;

FIG. 2 shows a communication network according to the invention;

FIG. 3 is a block diagram of a node of the network of FIG. 2;

FIG. 4 is a block diagram of a transceiver of the node of FIG. 3; and

FIG. 5 is a logic diagram of the error sensor of the transceiver of FIG. 4.

DESCRIPTION OF THE PREFERRED EMBODIMENT

Although the invention is useful in many communications loops that are polled or unpolled, which are synchronous or asynchronous, which communicate with only a master node or freely communicate among the nodes, there will be described by way of example in a periodically polled loop wherein each remote node includes a physical quantity sensor whose state is transmitted to a central node. The physical quantity can be heat, smoke, etc. if a fire alarm system is considered. It could also be moisture or the like for a flock alarm system. The type of physical quantity sensor is not important for an understanding of the invention.

In FIG. 2 the communication network 10 is shown comprising a central node NN1 and remote nodes NN2 to NN9 arrayed along a path from a first node NN1 to a last node NN5. The number of nodes is representative.

The central node NN1 periodically emits a polling signal from two output terminals onto respective cables T12 and T13 and sometime thereafter receives information as signals on cables T81 and T91. The remaining nodes are identical and have two input terminals and two output terminals. Generally, a typical node NNN has its first input terminal connected to a cable T(nl)n and its second input terminal connected to a cable T(nl)(n+1); and has its first output terminal connected to a cable Tn(n+1) and its second output terminal connected to a cable Tn(n+2). Thus, for example, node NN3 has its input terminals connected to cables T23 and T13 and output terminals connected to cables T34 and T35. A study of FIG. 2 shows some unique features. Generally, (except for node NN9) the output terminals of each node are connected to the input terminals of two different downstream nodes. More particularly along the path from left to right in FIG. 2 the output terminals of a node are connected to the input terminals of the second and fourth nodes to its right (further downstream) and generally from right to left along the path the output terminals of a node are connected to the second and fourth terminals to its left (further downstream). This "interleaving" insures that on a long run there is no extended return path as with the cable 16 of the network PA of FIG. 1.

As will hereinafter become apparent each of the remote nodes NN2 to 9 has internal thereto circuits which monitor heat and when interrogated will give an indication as to the state of that circuit, i.e., whether or not it is sensing abnormal heat indicating a fire. Furthermore, each remote node has circuitry which detects faulty reception of the transmission from the downstream nodes. The fault can lie in a downstream transmitter, in the cable connecting the two nodes, or the receiving circuits of the node. In particular, the typical remote node NN3 has circuitry which will not only record an error condition but will transmit an error signal from both of its output terminals onto cables T34 and T35 if it receives signals at only one input terminals and not the other. This error indicates a signal was not received from one of the cables T13 and T23. Nevertheless, circuit therein transfers the data from the receiving input terminal to both output terminals. Furthermore, within each remote node are identical master and slave transceivers. The master is operative until it faults. The fault is recorded and also a fault indication is transmitted down the loop, and the slave transmitter takes over. Thus, there is high reliability since the loop will fail only when both transceivers within a remote node fail together with their connections to the rest of the loop before the network fails. Since individual failures are noted and reported as they occur, prompt replacement and repair makes remote the possibility of a catastrophic failure.

It should be noted that a completely uniform loop is possible with all the nodes alike and all connections between nodes being the same with no exception. In such case one node is designated the master and its processing equipment would handle all external signalling of faults and errors.

While there are many kinds of information formats and internode cabling, there has been chosen for an example 8-bit words or bytes which are transferred on 8 parallel wire cables. Thus each of the cables Tnm is an eight-wire cable. Wire cables carrying 16-or-32-bit words are possible as are single wire cables with serial parallel converters in the node. The byte is arranged with four bits for a sending-node address, three bits for data and one bit for a strobe pulse in that order. The three data bits are coded to show whether there is an error or a fault and also the state of the heat sensor associated with the node address. The invention also contemplates internode communication. In such case the word would include a destination node address and the nodes would include an address decoder.

In operation central node NN1 periodically emits a polling byte simultaneously on cables T12A and T12B and T13. The byte is received at both input terminals of remote node NN2 unless one of the cables T12 is open. If both input terminals receive the byte, node NN2 transmits this byte onto cables T23 and T24 followed by an internally generated byte giving the address of this node, the state of the heat sensor therein and the fact that there is no fault. If node NN2 received the byte at only one input terminal or if one of its transceivers was faulty, the same bytes would be transmitted except the second byte would now include an error bit. At remote node NN3 the byte from central node NN1 on cable T13 if received activates a timing circuit which awaits the arrival of a byte from node NN2 on cable T23 or vice versa. In either case if both bytes are received within a given period of time, the byte generated by node NN1 is transmitted onto cables T34 and T35 followed by remote the byte generated by node NN2 followed by the internally generate byte of node NN3. This process continues until all bytes are received by central node NN1 which interprets the received data.

FIG. 3 shows a typical remote node NNN including twin transceivers TR1 and TR2 and control unit KU. Each of the transceivers has two inputs, one connected to cable T(n1)n and the other connected to cable T(n2)n, and two outputs, one connected to cable Tn(n+1) and the other connected to cable Tn(n+2). Control unit KU includes a control flipflop FF1 which under normal conditions after being initially cleared transmits a signal via line AL1 to control transceiver TR1 to be the active transceiver. If a transceiver fault indicating signal is received from transceiver TR1 via line FT1 the flip-flop terminates the signal on line AL1 blocking transceiver TR1 and initiates a signal on line AL2 which opens transceiver TR2. If a fault indicating signal is received on either line FT1 or FT2 it is transmitted from OR-circuit BG1 via line FT to both transceivers so that the active transceiver can transmit the fault information about the node downstream to the central node. The heat sensor HS in the control unit KU emits a signal on line DVO when excess heat is sensed. Otherwise it transmits a signal on line DVF. The switch SW1 is a manual clear switch which when closed emits a signal on line MCL. Generally, after a shut down for repair or replacement of parts, the switch is momentarily closed to initialize the node. It should be realized that remote electronic clearing could also be used.

The transceiver TR1 of FIG. 4 centers around multiplexor MUX having three sets of input terminals respectively connected to the output terminals of buffer BF1, buffer BF2 and register REG and a set of outputs connected to error checker EC and, via gate array AGS, to cables Tn(n+1) and Tn(n+2). Multiplexor MUX connects one of its sets of input terminals to its set of output terminals in accordance with which of its control inputs 1, 2 or 3 is energized in response to signals from error sensor ES. Buffers BF1 and BF2 can be 8-stage flip-flop registers having input terminals for receiving in parallel the bits of the bytes received from cables Tn(n−1) and Tn(n−2) respectively. The register REG can also be an 8-stage flip-flop register with five stages permanently set to indicate a strobe bit and the address of the node. The three remaining stages are connected respectively to the output of OR-circuit BG3, line DVF and line DVD to respectively register the presence of an error, the associated heat sensor sense excess heat and the associated heat sensor does not sense excess heat.

The error checker EC is connected to the output terminals of the multiplexor MUX and senses for all zeros during the transmission of bytes therefrom. Simply checker EC can be an 8-input NOR circuit whose output is sensed by signals on lines NW, 01 and 02 respectively. This checker which senses for an open cable is given by way of example. The invention also comtemplates other errors such as "stuck-on-one" etc. In such case the checker will be of a different form such as a parity checker for example. The gate array AGS is basically eight two-input AND-circuits each having a first input connected to one of the output terminals of multiplexor MUX and a second input connected to line AL1 from control unit KU so that when a signal is present on line AL1 the gates are open thus "activating" transceiver TR1.

The error sensor ES is shown in FIG. 5 and basically senses the signals on lines ST1 and ST2 to determine if bytes are received from the two downstream nodes.

In operation (see FIGS. 4 and 5), assume buffer BF1 receives a byte from node NN(N−1). The strobe bit of this byte causes a signal on line ST1 which sets flip-flop FF2. The 1-output of that flip-flop passes a signal via OR-circuit BG3 which triggers delay multivibrator DMV1. This multivibrator is designed to emit a pulse a given time thereafter. The time is chosen such that a byte emitted from node NN(N−2) should reliably be received by buffer BF2. Assume this is the case. Therefore, before multivibrator DMBV1 emits a pulse a signal is present on line ST2 which sets flip-flop FF3 whose 1-output goes high. Thus when the pulse from multivibrator PMV1 strobes the AND-circuits AG2, AG3 and AG4 only the latter emits a pulse onto line OK. The signal on line OK passes through OR-circuit BG2 which energizes the 2-input of multiplexor MUX and the contents of buffer BF2 are fed via the gate array AGS to the nodes NN(N+1) and NN(N+2) while error checker EC checks for the all zero error. Shortly, thereafter delay multivibrator DMV2 in response to the pulse emitted by delay multivibrator DMV1 emits a pulse on line CL which not only sets flip-flop FF6 but also clears buffers BF1 and BF2. Any subsequent bytes pass through in the same manner. Note that when flip-flop FF6 was set line NW went low blocking AND-circuits AG5 and AG6, and the 1-output of the flip-flop when high alerting AND-circuit AG7. This is because once a sequence of bytes passes through a node from two downstream nodes there is an offset at the end of the sequence. Thus it is assumed that once the first byte of a sequence is received, all subsequent bytes will be received.

After no more bytes are received at both buffers the signals on lines ST1 and ST2 both go low causing NOR-circuit BG4 to emit a pulse which clears flip-flop FF6. In response thereof the signal on line NW goes high causing multiplexor MUX to connect register REG to gates array AG5 and the specific information about this node is entered into the loops. If there is no error then the only information will be the state of the node's heat sensor. Thereafter the pulse on line NW after a delay by delay device D clears the variable part of register REG.

Assume, only the buffer BF2 received a byte within the given time. Then flip-flop FF2 is not set and its 0-output is low. The pulse from multivibrator DMV1 passes through AND-circuit AG2 setting flip-flop FF5 causing a high signal on line E2 which passes through AND-circuit AG-1 to line 01 connected in control input 1 of the multiplexor MUX. In response thereof the contents of buffer BF1 is fed from the transceiver. In addition, the signal on line E2 is fed via OR-circuit BG3 to register REG so that when the node transmits its internally generate byte it will include information about the downstream error. Note a similar operation would occur if a byte were received by buffer BF2 instead of BF1, except that buffer BF2 would be connected to gate array AG5.

Whenever the error check EC senses an internally generator error it emits an FT1 signal to control unit KU which clears flip-flop FF1 (See FIG. 3) terminating the signal on line AL1 to block transceiver TR1, and opening transceiver TR2.

In addition, the signal on line FT1 passes via OR-circuit BG1 to line FT which is fed to both. Assume the transceiver of FIG. 4 is the open transceiver. The signal on line FT passes through OR-circuit BG3 to be registered as error information which gets transmitted in the internally generated node byte. Once an error is noted it is continuously repeated for each polling cycle until there is human intervention by depressing the switch SW1 which generates a signal on line MCL to set flip-flop FF1 and clear the flip-flops FF4, FF5 and FF6.

What is claimed is:

1. A communication network comprising a plurality of nodes, arranged along a looplike path, each of said nodes including a transmitting means for transmitting signals and two receiving means and a signalling means for transferring to the associated transmitting means one kind of signal when signals are received by both associated receiving means and another kind of signal when only one of the receiving means receives a signal, and means for connecting the transmitting means of each node to one of the receiving means of two different successive nodes, said connections being such that each node receives signals from two different nodes remote from it in one direction along the path and transmits signals to two different nodes remote from it in the opposite direction along the path.

2. The communication network of claim 1 wherein one of said nodes is the central node and the remaining nodes are remote nodes.

3. A communication network comprising a central node, including a receiving means for receiving signals and transmitting means for transmitting signals, a plurality of remote nodes each including two receiving means and a signalling means for transferring to the associated transmitting means one kind of signal when signals are received by both associated receiving means and another kind of signal when only one of the receiving means receives a signal, said remote nodes being arranged along a path extending from said central node, means for connecting the transmitting means of one remote node to the receiving means of two different remote nodes further along the path except for the last remote node along the path, means for connecting the transmitting means of the central node to the receiving means of the first and second remote nodes along the path, and means for connecting the transmitting means of said last nodes along the path to the receiving means of said central node.

4. The communications network of claim 2 or 3 wherein the remote nodes are aligned serially along a path wherein a first node in the region of a first end of the path is spaced from a second remote node in the region of a second end of the path by a plurality of remote nodes; and from said first remote node to said second remote node of the path the transmitting means of one remote node is connected to the receiving means of two different remote nodes which are not adjacent whereby alternate remote nodes are connected in an open loop in a direction from said first end toward said second end, and in the direction from said second end to said first end of the path the transmitting means of the remaining remote nodes are connected to the receiving means of two different remaining remote nodes whereby the remaining remote nodes are connected in an open loop in a direction from second end to said first end so that a continuous loop is formed from the first remote node, via said second remote node back to a remote node adjacent said first remote node.

5. The communications network of claim 4 wherein the transmitting means of one remote node is connected to receiving means of the second next and fourth next nodes.

6. The communications network of claim 2 or 3 wherein the remote nodes includes means for storing an error indication whenever the two receiving means thereof do not receive a signal.

7. The communications network of claim 2 or 3 wherein said remote nodes comprises two transceivers each including said receiving, signalling and transceiving means, and furthermore, comprising means for switching from one transceiver to the other in case of a fault in said one transceiver.

* * * * *